United States Patent Office 2,782,820
Patented Feb. 26, 1957

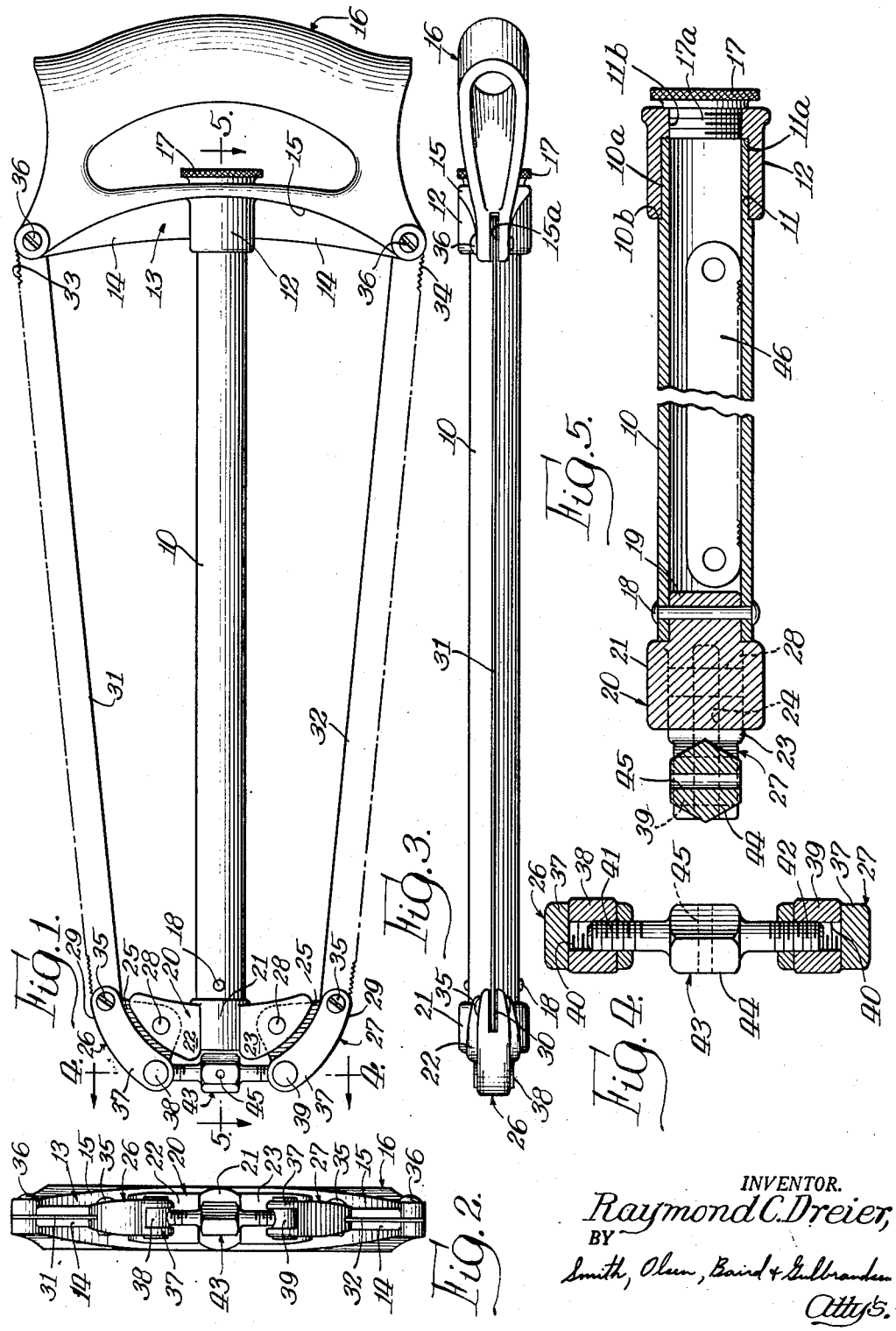

2,782,820
HANDSAW

Raymond C. Dreier, Chicago, Ill., assignor to Dreier Brothers, Inc., Chicago, Ill., a corporation of Illinois Application January 18, 1954, Serial No. 404,475

6 Claims. (Cl. 145—32)

This invention pertains to hand-saws and more particularly to a saw of highly improved construction especially useful to plumbers and other artisans whose work requires frequent use of hand operated hacksaws and the like.

One of the principal objects of the present invention is to provide a lightweight hand-saw of superior strength having its essential parts arranged symmetrically about a centrally disposed principal frame member that is subjected substantially only to forces of compression when the blade or blades of the saw are tensioned. A further object of the invention is to provide a saw of the above character having a pair of blades arranged substantially symmetrically on opposite sides of the centrally disposed principal frame member, with adjacent ends of the blades secured to pivoted mechanism at one end of the frame member for transferring the tensional forces in each blade directly to the other, thereby eliminating substantially all bending moment on the frame member regardless of the small differences normally present in the lengths of the blades, and regardless of imperfections and unavoidable differences in the actual symmetry of the parts arising as a result of imperfect manufacture and normal wear and tear or from other causes. Still another object of the invention is to provide in the saw means by which both blades are always simultaneously tightened or tensioned to the same degree regardless of the small differences, referred to above, that may exist in the lengths of the blades or in the dimensions of the various parts. By reason of the above characteristics, the tensional forces in the blades are substantially all transmitted to the centrally disposed frame member in such a way that the frame member is subjected only to pure compression without material bending moment, thereby greatly adding to the strength of the saw and permitting the use of a lightweight frame member. Yet another object of the invention is to provide means by which the blades may be readily replaced, means also being provided within the interior of the principal frame member for storing and carrying extra blades. Another object of the invention is to provide a highly efficient saw having two blades mounted thereon in such manner and in such position that both are ready for instant use and either one may be selectively brought into engagement with a workpiece merely by turning the saw over in the hand.

These and other objects and advantages of the invention will be apparent from the following description of a preferred embodiment thereof, taken with the accompanying drawing wherein:

Fig. 1 is an elevational view of a hack saw incorporating the features of the present invention;

Fig. 2 is a view, on an enlarged scale, of one end of the saw, as seen from the left of Fig. 1;

Fig. 3 is a plan or edge view of the saw;

Fig. 4 is a cross-sectional view on an enlarged scale taken substantially along the line 4—4 in Fig. 1; and Fig. 5 is a fragmentary cross-section, again on an enlarged scale, taken along the line 5—5 in Fig. 1.

As illustrated in the drawing, the saw is comprised of a longitudinally straight frame member consisting of a hollow tube 10 which extends in an axial position along the principal length of the saw. The right-hand end 10a of the tube, as seen in Fig. 5, is of a slightly reduced outside diameter and joins with the principal portion of the tube at a shoulder 10b. This end of the tube is press-fitted and silver-soldered, or otherwise fixed, in an opening 11 provided in a boss 12 centrally formed in a rigid cross-member designated generally by the numeral 13. The opening 11 is provided with a shoulder 11a that is abutted by the end extremity of the tube 10, and the shoulder 10b on the tube abuts the boss 12 at the mouth of the opening. The rigid cross-member 13 may be cast as a unitary piece and is symmetrical with respect to the end of the tube 10, the cross-member being comprised of a flange 14 that lies in the plane of the axis of the tube 10 and a curved flange 15 that, generally speaking, is at right angles to the flange 14 and has a handle 16 formed integrally thereon. As will be seen in Figs. 1 and 3, this handle may be of hollow construction and, like the cross-member 13, of which it is a part, it is disposed symmetrically with respect to the tube 10. The outer end of the opening 11 is threaded as at 11b to receive the threads 17a of an externally threaded plug 17.

Fixed in the opposite end of the tube 10, as by a through-rivet 18 or by silver-solder or the like, is a cylindrical, boss-like projection 19 integrally formed on a second rigid cross-member 20 which is comprised of a heavy, generally cylindrical central portion 21 from which two flange-like ears 22 and 23 extend on opposite sides substantially in the plane of the flange 14 of the cross-member 13. As with the cross-member 13, the cross-member 20 is symmetrical with respect to the tube 10. Both cross-members extend transverse the respective ends of the tube 10 but the cross-member 20 at the front of the saw structure extends on opposite sides of the tube a distance substantially less than the cross-member 13.

The ears 22 and 23 are vertically and centrally slotted, as at 24 (Fig. 5), respectively to receive flange-like portions 25 of a pair of substantially identical, generally triangularly shaped, links or bellcranks 26 and 27 that are pivotally mounted in the slots on pivot pins 28. The outer portions of the links are of increased thickness for added strength and are gracefully rounded so that the forward end of the saw, of which they are a part, may be comfortably gripped in one hand while the other hand grasps the handle 16. Corresponding corners or ends 29 (Fig. 1) of the links 26 and 27 are centrally and vertically slotted, as at 30 (Fig. 3), respectively to receive one end of a pair of ordinary hack saw blades 31 and 32. One of these saw blades preferably is provided with coarse teeth 33 and the other with fine teeth 34, both of the blades having their corresponding ends pivotally mounted in the slots 30 of the respective links or bellcranks 26 and 27 on threaded screws 35 which extend through the links and the slots 30 therein. The other ends of the saw blades are fixed by means of screws 36 in slots 15a (Fig. 3) provided in the extremities of the flange portion 15 of the cross-member 13.

The remaining corresponding ends or corner 37 of the links 26 and 27 are bifurcated and respectively are provided with a pair of pivot pins 38 and 39 having transverse threaded openings 40 therein (Fig. 4) for receiving the opposite threaded ends 41 and 42 of a turnbuckle 43. The turnbuckle may be provided with a hexangular or, if desired, a knurled central body portion 44 by which it may be turned. The body portion may also be provided with a transverse passage 45 into which a nail or other instrument may be inserted to forcefully turn the turnbuckle when necessary.

The ends of the turnbuckle and the corresponding openings 40 in the pivot pins 39 are threaded in opposite directions. It will thus be understood that, with the saw blades 31 and 32 installed as illustrated, turning of the turnbuckle in one direction will pivot the two links in opposite directions with equal force about the pivot pins 28 to draw the links toward each other and simultaneously tension the two blades. Because of the construction described above, both blades will always be tensioned equally regardless of the slight differences in length that normally are present in ordinary hack saw blades and regardless of minor variations or differences in the dimensions of the links 26 and 27 and their related parts, the tension of one blade being transferred directly to the other through the medium of the pivoted links 26 and 27 and the interconnecting turnbuckle 43. This is believed to be a highly novel result never before attained in the handsaw art. It will also be apparent that, because the two blades 31 and 32 are always of the same tension, each balances out the bending moment that would otherwise be applied by the other to the tube 10 of the principal frame member of the saw, with the result that the tube 10 has only pure compressive forces applied thereto. This renders the entire saw exceptionally sturdy and strong in spite of the fact that relatively light weight materials may be used in its construction.

The proportioning and symmetrical arrangement of the parts of the saw about the tube 10, together with the converging disposition of the blades with respect to each other, causes the blades, during a natural sawing stroke to be presented to a workpiece at the most advantageous angle and gives to the saw a light, balanced feel in the hands of a workman, thereby further contributing to its efficiency. Inasmuch as both blades 31 and 32 are equally tensioned and occupy the same relative position with respect to the tube 10 and the handle 16, it will be apparent that the two may be selectively brought into cutting action by a workman merely by turning the saw over in the hand. Thus, the workman has at his immediate disposal both a coarse toothed blade and a fine toothed blade, either one of which he may apply to his job without a moment's delay.

When the blades 31 and 32 become dulled, or for any other reason require replacement, the turnbuckle 43 is turned in the proper direction to loosen the blades and the screws 35 and 36 are retracted or removed, whereupon the blades are lifted freely from the saw structure. Extra blades 46 are stored and carried in the hollow interior of the tube 10 and are made quickly available for replacement of blades 31 and 32 merely by removing the threaded plug 17 and sliding the new blades 46 out of the opening 11 in the cross-member 13.

The foregoing description of one embodiment of the present invention has been made for clearness of understanding only and no unnecessary limitations are intended thereby, for it will be apparent to those skilled in the art that numerous variations and modifications may be made in the saw within the scope and spirit of the appended claims.

I claim:

1. A saw comprising, a straight longitudinal compression frame member, a rigid cross-member on one end of said frame member, a pair of links pivotally mounted on opposite sides of said frame member adjacent the other end thereof, a pair of tensioned elements on opposite sides of said frame member respectively connected at one of their ends to said cross-member and pivotally connected at their opposite ends to said links, at least one of said tensioned elements being a saw blade, and means interconnecting said links for transferring the tensional forces from one of said tensioned elements to the other through said links, thereby equalizing the tensions in said elements.

2. A saw comprising, a straight longitudinal frame member, a rigid cross-member on one end of said frame member, a pair of links pivotally mounted on opposite sides of said frame member adjacent the other end thereof, a pair of tensioned elements on opposite sides of said frame member respectively connected at one of their ends to said cross-member and pivotally connected at their opposite ends to said links, at least one of said tensioned elements being a saw blade, and a threaded turnbuckle pivotally connected at its opposite ends to said links for simultaneously pivoting the same in opposite directions to produce an equal state of tension in said tensioned elements regardless of small differences in the lengths of said elements.

3. A double-bladed saw comprising, a straight longitudinal frame member, a rigid cross-member on one end of said frame member, said cross-member extending transversely of said frame member on opposite sides thereof, a second rigid cross-member on the opposite end of said frame member and extending transversely thereof a distance less than said first mentioned cross-member, a pair of links respectively pivotally mounted upon said second cross-member adjacent the opposite extremities thereof, a pair of saw blades on opposite sides of said frame member respectively connected at one of their ends to said first cross-member adjacent its opposite extremities and pivotally connected at their opposite ends to said links, said blades converging toward each other by reason of the difference in the lengths of said first and second cross-members, and a threaded turnbuckle pivotally connected at its opposite ends to said links for simultaneously pivoting said links in opposite directions to produce an equal state of tension in said blades and a resultant state of substantially pure compression in said frame member regardless of small differences in the lengths of said blades.

4. A double-bladed saw comprising, a straight longitudinal frame member, a rigid cross-member on one end of said frame member, said cross-member extending transversely of said frame member on opposite sides thereof, a second rigid cross-member on the opposite end of said frame member and extending transversely thereof, a pair of links respectively pivotally mounted upon said second cross-member adjacent the opposite extremities thereof, a pair of saw blades on opposite sides of said frame member respectively connected at one of their ends to said first mentioned cross-member adjacent its opposite extremities and pivotally connected at their opposite ends to said links, and means interconnecting said links for simultaneously pivoting the same with equal force in opposite directions to produce an equal state of tension in said blades regardless of small differences in the lengths of said blades and in the dimensions of said links.

5. A double-bladed saw comprising, a straight longitudinal frame member, a rigid cross-member on one end of said frame member, said cross-member extending transversely of said frame member on opposite sides thereof, a second rigid cross-member on the opposite end of said frame member and extending transversely thereof, a pair of generally triangularly shaped links respectively pivotally mounted adjacent the corresponding apices thereof upon said second cross-member adjacent its opposite extremities, a pair of saw blades on opposite sides of said frame member respectively connected at one of their ends to said first mentioned cross-member adjacent its opposite extremities and pivotally connected at their opposite ends to said links adjacent corresponding corners thereof, and means connected to the remaining corners of said generally triangular links for simultaneously pivoting said links in opposite directions to produce an equal state of tension in said blades regardless of small differences in the lengths of said blades and in the dimensions of said links.

6. A double-bladed saw comprising, a longitudinal compression frame member, a rigid cross-member on one end of said frame member, said cross-member extending symmetrically on opposite sides of said frame member and having a handle thereon, a second rigid cross-member symmetrically mounted on the other end of said frame member, a pair of substantially identical bellcranks respectively pivotally mounted upon said second cross-member adjacent the opposite extremities thereof, a pair of saw blades symmetrically disposed on opposite sides of said frame member and respectively connected at one of their ends to said first mentioned cross-member adjacent its opposite extremities and pivotally connected at their opposite ends to said bellcranks, and means interconnecting said bellcranks for simultaneously pivoting the same with equal force in opposite directions to produce an equal state of tension in said blades and a substantially pure state of compression in said frame member regardless of small differences in the lengths of said blades and in the dimensions of said bellcranks.

References Cited in the file of this patent

UNITED STATES PATENTS

| | | |
|---|---|---|
| 211,703 | Clauser | Jan. 28, 1879 |
| 400,906 | Forsaith | Apr. 9, 1889 |
| 549,167 | Swenson | Nov. 5, 1895 |
| 685,291 | Nicol et al. | Oct. 29, 1901 |
| 1,710,549 | Mungo | Apr. 23, 1929 |
| 2,049,844 | Legros | Aug. 4, 1936 |
| 2,332,545 | Acomb | Oct. 26, 1943 |
| 2,399,869 | Hough | May 7, 1946 |

FOREIGN PATENTS

| | | |
|---|---|---|
| 630,834 | France | Aug. 29, 1927 |